Figure 1:
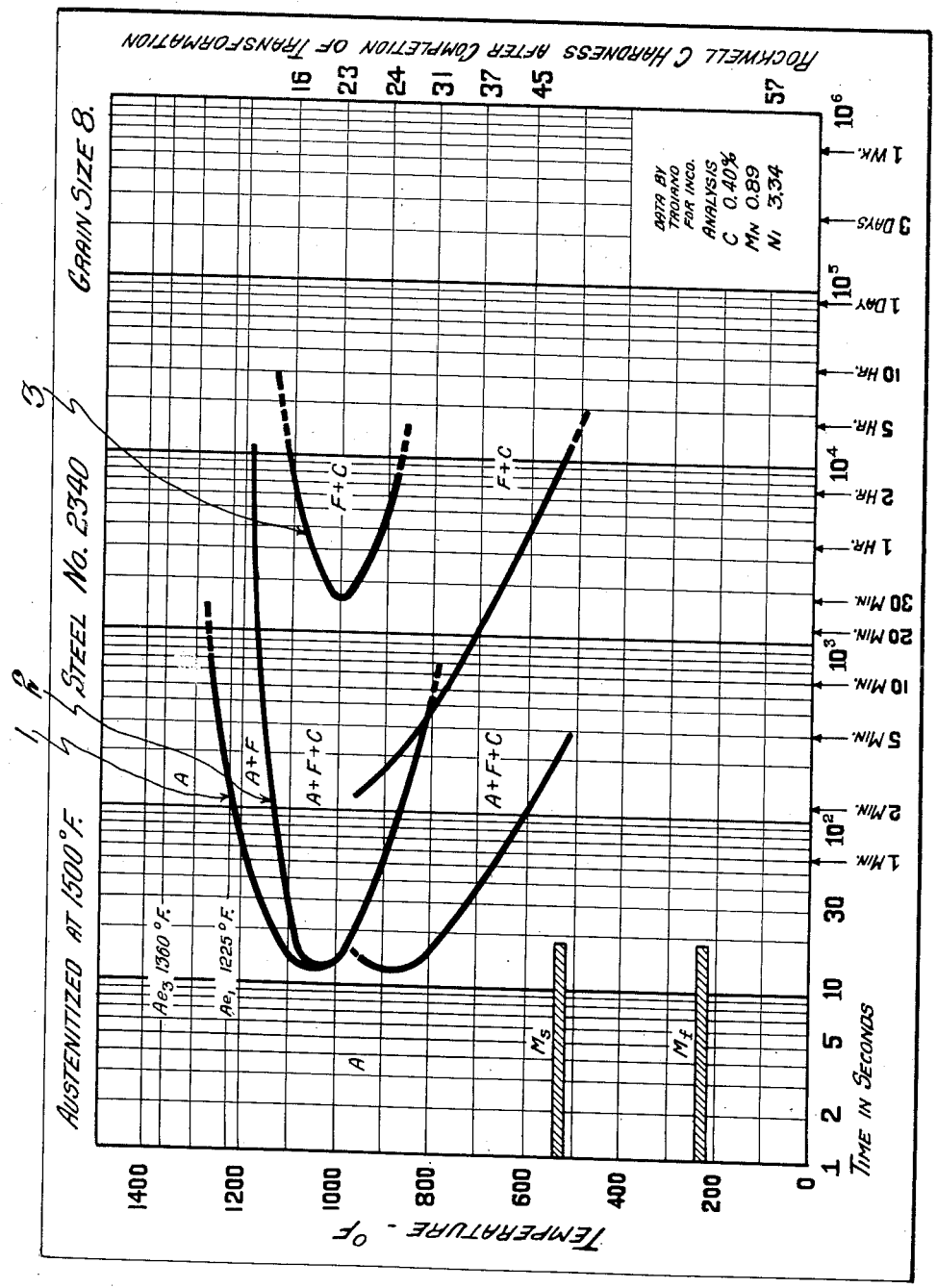

June 20, 1950 J. W. SANDS 2,512,387
ADAPTER FOR ISOTHERMAL TRANSFORMATION DIAGRAMS
Filed May 21, 1948 3 Sheets-Sheet 1

INVENTOR
JOHN W. SANDS
BY
ATTORNEY

June 20, 1950      J. W. SANDS      2,512,387
ADAPTER FOR ISOTHERMAL TRANSFORMATION DIAGRAMS
Filed May 21, 1948      3 Sheets-Sheet 2

INVENTOR
JOHN W. SANDS
BY
ATTORNEY

June 20, 1950     J. W. SANDS     2,512,387
ADAPTER FOR ISOTHERMAL TRANSFORMATION DIAGRAMS
Filed May 21, 1948     3 Sheets-Sheet 3

INVENTOR
JOHN W. SANDS
BY
A. W. Diller
ATTORNEY

Patented June 20, 1950

2,512,387

UNITED STATES PATENT OFFICE 2,512,387

ADAPTER FOR ISOTHERMAL TRANFORMATION DIAGRAMS

John Woodbury Sands, Westfield, N. J., assignor to The International Nickel Company, Inc., New York, N. Y., a corporation of Delaware Application May 21, 1948, Serial No. 28,293

1 Claim. (Cl. 235—89)

The present invention relates to the art of determining heat treatments to be given to known steels of differing chemical composition in order to obtain certain desired properties and metallurgical structures and, more particularly, a transparent adapter computing device adapted to be superimposed upon the standard isothermal transformation diagrams so as to give supplemental computation or calculation to predict performance under conditions of continuous cooling and at varied rates of cooling.

An object of the invention is to provide a convenient means to facilitate the solution of heat treatment requirements under conditions of continued cooling, varied rates of cooling, and with respect to different steels.

A further object of the invention is to provide a transparent computation device or overlay adapted to be superimposed upon isothermal transformation diagrams and containing a multiplicity of cooling curves to be read with relation to the diagrams as a base chart and adapted to give a supplemental computation to predict the performance under conditions of continuous cooling at varied rates of cooling.

Another object of the invention is to provide a transparent computing device of the type referred to adapted to be superimposed upon a series of isothermal transformation diagrams and containing a multiplicity of cooling curves to give supplemental computation to predict performance under conditions of continuous cooling and containing position marking for determining the correct positioning of the transparent overlay with relation to the base chart diagram and particularly with relation to the $Ae_1$ temperature indication of the specific chart with which the overlay or adapter is employed.

Other objects, purposes and uses as well as features and advantages of the improved adapter or overlay embodying the present invention will be more clearly apparent from the following detailed description of a preferred embodiment illustrated in the accompanying drawings, wherein like reference characters are applied to the corresponding parts in the several views.

Figure 2:
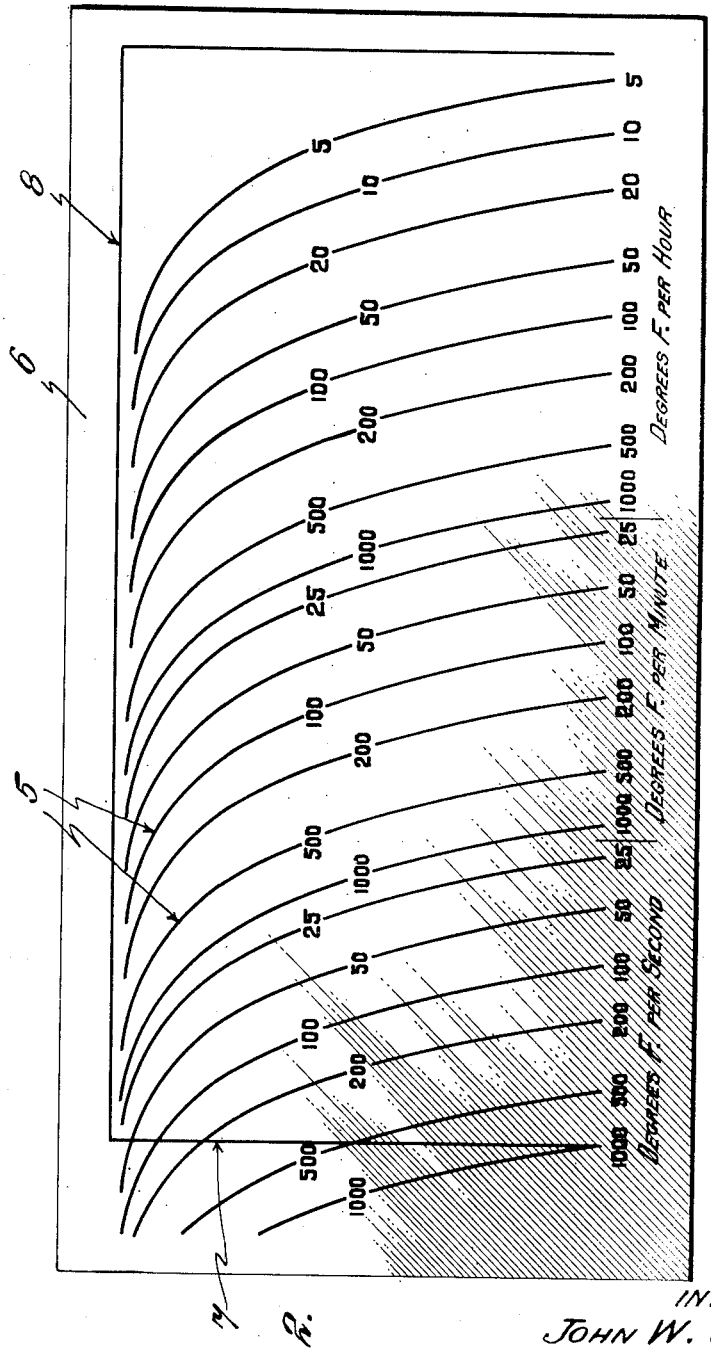
Figure 3:
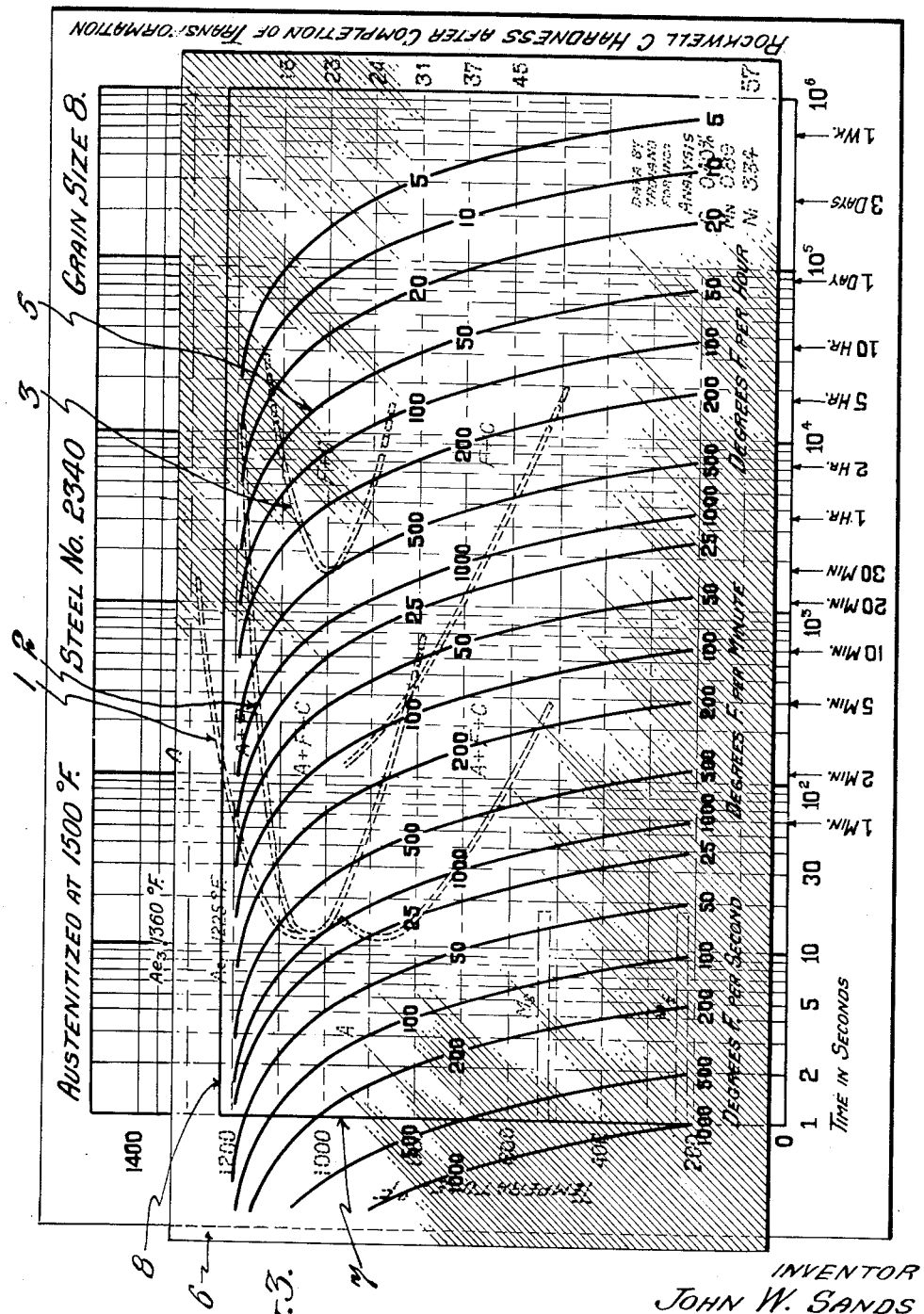

In the drawings:

Fig. 1 is a plan view of a standard form of isothermal transformation diagram as prepared to indicate the physical structure and properties obtainable with relation to a specific steel identified as steel No. 2340 under the system used by the American Iron and Steel Institute;

Fig. 2 likewise depicts a plan view of the transparent adapter or overlay of the present invention containing the series of cooling curves and position markings and wherein each of the cooling curves represents different rates of cooling and which are readable with relation to the isothermal transformation diagrams as a base chart to give supplemental or modified readings to predict performance or results obtainable under conditions of continuous cooling and at the indicated rates of cooling; and Fig. 3 also shows a plan view showing the manner of use of the transparent adapter wherein the adapter is superimposed upon the isothermal transformation diagram of Fig. 1 in correct position for calculation of the performance and results to be expected at given rates of cooling and over varied time periods.

As is well known in the metallurgical industry, the isothermal transformation diagrams or charts are prepared with reference to given steels as commercially used. These diagrams or base charts portray the transformations obtained "isothermally" or with a constant or maintained temperature for given periods of time. In the use of the adapter or transparent overlay device embodying the present invention, the "base" information on the chart is employed and supplemented by cooling curves on the transparent overlay to predict performance under conditions of continuous cooling at given rates of cooling and over varied time periods. A device is thereby provided which is adapted for use with the known isothermal transformation diagrams to give quickly and with a practical degree of accuracy the desired heat treatment in order to secure the desired results such as certain properties and metallurgical structures. The base charts or isothermal transformation diagrams, which are available as standard publications, give the data related to transformations occurring when the steel is quickly cooled from above a critical temperature to lower temperatures as indicated by ordinates of the diagram and maintained at the indicated lower temperatures for time intervals as denoted by the abscissae of the diagram.

An essential feature in carrying the present improvement into practice is the preparation of isothermal transformation diagrams of standardized dimensions for the different steels with corresponding dimensional spacing of the ordinates indicating temperature and abscissae indicating time with additional indication of the critical temperatures and more particularly the $Ae_1$ temperature below which the transformations from the austenitic condition occur as related to the specific steels covered by the respective diagrams. A further important feature of the invention is the provision of the transparent adapter or overlay having a multiplicity of cooling curves indicative of various rates of cooling for reading with relation to the base chart and which embodies guide marking or line indications positioned with relation to the cooling curves to determine the proper position of the adapter or overlay with relation to the indications of the base chart and wherein the proportions of the adapter and of the cooling curves in their spaced relation are such as to adapt the overlay device for employment with the series of base diagrams or charts for cooperative reading therewith. The use of the adapter thus gives the supplemental information as to properties and characteristics obtainable under given and varied continuous rates of cooling as may be desired and best suited to the industrial conditions of production heat treatments.

A problem in the steel industry is to determine what heat treatment is to be given to a certain steel in order to obtain desired properties or metallurgical structures. Under conventional practice the metallurgist can only obtain limited guidance in this respect from the known isothermal transformation diagrams of the type illustrated in Fig. 1. These diagrams give the data related to transformations occurring when the specific alloy steel is quickly cooled from above the critical temperature to lower temperatures as indicated by the ordinates of the diagram and maintained at the indicated lower temperatures for time intervals as denoted by the abscissae of the diagram. However, since in general commercial practice it is often desirable and more convenient in heat treating furnace operations to carry out the heat treatment as a continuous cooling operation and at varied rates of cooling best suited to the furnace operations, it is required that the properties and transformations occurring with the given steel shall be determined for conditions of continuous cooling as distinguished from that of the isothermal transformations as customarily disclosed by the conventional isothermal diagrams.

The isothermal transformation diagram, of which an example is given in Fig. 1 and drawn with relation to alloy steel No. 2340, is made up of a series of curves printed or drawn upon a semi-logarithmic chart wherein the ordinates indicate various degrees of temperature and the abscissae indicate time intervals as noted thereon. In the series of illustrated curves, one curve (1) represents the time required for free ferrite to start to separate from the austenite (indicated by the upper curve or "ferrite" line), the curve immediately below (2) represents the time required for beginning transformation to a ferrite and carbide aggregate or "pearlite" line, and the curve to the right of these (3) shows the time for the completion of the transformation. The lower curves are related to a separate autenite transformation or "bainite" transformation which has an overlapping relation to the "pearlite" transformation.

The isothermal transformation diagram or base chart portrays the transformations obtained isothermally or with a constant or maintained temperature. In accordance with the present invention, the information of the isothermal transformation diagram, as illustrated by the chart in Fig. 1, is employed as a base and is supplemented by cooling curves on a transparent adapter or overlay designed to predict performance under conditions of continuous cooling. In so doing it is to be observed that continuous cooling tends to shift the location of the transformations downward and to the right from the positions denoting their location when obtained isothermally. It is also to be noted that to allow for displacement of the curve due to continuous cooling, the controlled cooling must be continued to 50° lower than the indicated temperature.

In Fig. 2 of the drawing, there is shown the transparent adapter or overlay embodying the present invention made by incorporating a multiplicity of cooling curves 5 upon suitable transparent material, such as a cellophane blank 6. The cooling curves may be embossed, etched or printed on the blank. The curves 5 are suitably spaced and positioned with relation to the vertical guide line 7 and upper horizontal guide line marked 8 to be properly readable when superimposed upon the base chart with the line 7 in registration with the left hand vertical line of the base chart and with the line marked 8 in registration with the line of the base chart representing the temperature at which controlled cooling is to start (usually the $Ae_1$ line). When so positioned the curves and chart are cooperatively readable to predict the transformations obtainable upon continuous cooling at the rates of cooling and for the time intervals indicated by the adapter in association with the curves of the base chart.

In order to utilize the single transparent adapter with a plurality of isothermal transformation diagrams for various steels the diagrams are made of a corresponding or standard size. Accordingly the single adapter illustrated in Fig. 2 may be correspondingly employed with each of a series of isothermal transformation diagrams to give the modified or supplemental information, or informative prediction under conditions of continuous cooling, as related to various steels.

As an example of a typical use for reading of the base diagram and the transparent cooling curve adapter overlay, there is shown in Fig. 3 the use of the adapter or overlay properly superimposed upon the isothermal transformation diagram for alloy steel No. 2340 as illustrated in Fig. 1. The base chart of Fig. 1 and the transparent overlay provided with the cooling curves are, as referred to, drawn to the same scale. As indicated in Fig. 3 the positioning guide line 8 of the overlay is placed in corresponding position with the $Ae_1$ line of the base chart and the vertical guide line 7 of the overlay is correspondingly positioned to overlay the left hand marginal line of the base chart or isothermal transformation diagram thereby correctly positioning the adapter for reading with relation to the information of the base chart diagram.

While it is theoretically true that the isothermal transformation diagrams or base charts portray the course of transformations obtained isothermally, the transformation thereon, in accordance with the use of the adapter as shown in Fig. 3 is also used theoretically to predict performance under continuous cooling. The adapter cooling curves are plotted to the same time temperature scale as the curves of the base charts. The adapter cooling curves represent the time temperature relationship for constant and continuous rates of cooling. It will be understood that these curves if drawn on coordinates having linear temperature and time scales would be straight lines each with a slope equal to its assigned cooling rate and that the curves are such as to compensate for or to adjust the readings with relation to the semi-logarithmic chart as employed. In superimposing the adapter on the chart as hereinbefore referred to, it should be recognized that the continuous cooling tends to shift the curves downward and to the right and also that the cooling must start at the $Ae_1$ temperature (or below if the steel is quickly cooled to a lower temperature) since austenite has no tendency to transform at any higher temperature. The cooling rate down to the $Ae_1$ temperature is, therefore, immaterial except in connection with separation of proeutectoid ferrite or carbide.

In the specific use of the transparent overlay as illustrated in Fig. 3 it may be considered, for example, that it is desired to anneal the steel of the isothermal transformation diagram illustrated to obtain a Rockwell hardness of C 16 by controlled furnace cooling. After austenitizing, the steel may be cooled as convenient to 1225° F. representing the $Ae_1$ temperature of this specific alloy. The base chart (isothermal transformation diagram) shows that to obtain the desired hardness of Rockwell C 16 isothermally, transformation should be at 1100° F. which requires about 2½ hours. As before referred to and as readily appreciated a fairly close approximation of the same effect can be obtained by continuously cooling from the $Ae_1$ temperature at such a rate that the same amount of time has elapsed (2½ hours) when the steel reaches a temperature of 1100° F. To cool from 1225° F. ($Ae_1$) to 1100° F. in 2½ hours is at a rate of 50° F. per hour. To allow for the displacement of the curves of the diagram caused by continuous cooling, controlled cooling should be continued to 50° lower than the indicated temperature, or in this case to 1050° F. to obtain the desired result. The steel, therefore, should be cooled from 1225° F. to 1050° F. at a rate of 50° F. per hour and requiring 3½ hours. The steel may then be removed from the furnace and cooled in any convenient manner as transformation is now complete and no further reaction will take place.

The information as outlined in the preceding paragraph is, as illustrated in Fig. 3, rapidly obtainable, which may be a matter of seconds, by use of the transparent adapter superimposed on the base chart in the position as indicated. As referred to and as shown in Fig. 3 the transparent adapter is placed over the base diagram in such manner that the two vertically straight lines coincide with the vertical marginal line at the left and at the right of the diagram. The adapter device is then moved up or down until the horizontal reference line 8 is located at the temperature from which controlled cooling is to begin. This latter temperature ordinarily, and as indicated in the positioning of the adapter in Fig. 3, corresponds to the $Ae_1$ temperature guide line so marked. With the adapter so positioned it will immediately become apparent that the cooling rate which intersects the end of the transformation curve 3 at the Rockwell C 16 level is 50° F. per hour, that the temperature is 1100° F. and that controlled cooling should, therefore, be carried to 1050° F. This latter temperature is determined by the adjustment downward of 50° F. as previously explained. The reading on the time scale (abscissae) at the latter temperature shows that the total time required (from 1225° F. to 1050° F.) will be 3½ hours.

With the same setting the adapter shows at a glance that complete transformation to pearlite may be secured by cooling from 1225° F. at any cooling rate up to approximately 500° F. per hour, which is the maximum rate which will intersect the line representing the end of the pearlite transformation. However, increasing cooling rates intersect this line at progressively lower temperatures and the resultant structures will, therefore, be progressively harder. It will also be noted that at a cooling rate of 200° F. per hour, for example, the adapter shows that cooling to 1000° F. (50° F. lower than the intersection) and requiring a little over an hour will yield a hardness of about Rockwell C 20 thus saving furnace time where a moderately higher hardness can be tolerated.

Also with the same setting, the adapter indicates that a cooling rate of 1000° F. per minute (17° F. per second) is sufficiently fast to avoid the pearlite nose and, therefore the formation of any pearlite transformation products, while a rate of 30° F. per second will avoid both noses and insure a full martensitic structure with the specific alloy under consideration.

As will be apparent from the foregoing, the transparent adapter or multiple cooling curve overlay embodying the present invention affords a means to facilitate the calculation of the treatment to be given steels when subjected to conditions of continuous cooling in order to obtain the desired properties such as hardness or metallurgical structure and thereby to avoid the series of mathematical calculations which are otherwise necessary. While a preferred embodiment of the features of the invention is illustrated and described, it will be understood that modifications may be made therein without departing from the scope of the invention as defined in the appended claim. As illustrative thereof, while guide lines or markings are provided on the adapter device for determining the correct reading position of the adapter on the base charts, it will be understood that the top horizontal and left hand vertical edges of the adapter itself may be employed as the positioning determining means by the trimming of the adapter on lines positioned to correspond with the guide lines as illustrated.

I claim:

A computing device for indicating the properties and transformations occurring with given alloys and heat treatments comprising isothermal transformation diagram base sheets having provided thereon a semi-logarithmic chart marking wherein the ordinates indicate various degrees of temperature and the abscissae indicate time intervals, a marking on the sheet positioned to indicate the $Ae_1$ temperature of a given alloy, a vertical guide line on the sheet, indicia on the sheet positioned relative to the ordinates and denoting hardness obtainable isothermally at different temperatures, graphic curves printed on the sheet developed and positioned to portray transformations obtainable isothermally for a given alloy and in combination therewith a transparent adapter overlay having a family of cooling curves drawn thereon indicating varied cooling rates, said overlay having guide lines thereon for positioning superimposed on the vertical guide line and the $Ae_1$ temperature marking of the base sheet, said adapter cooling curves being of a form and positioned so that confluence of a curve with a graph of the base sheet establishes the point of reference for the particular data involved to give supplemental information based on varied rates of continuous cooling.

JOHN WOODBURY SANDS.

REFERENCES CITED

The following references are of record in the file of this patent:

UNITED STATES PATENTS

| Number | Name | Date |
|---|---|---|
| 2,179,531 | Trapnell | Nov. 14, 1939 |

OTHER REFERENCES

"Graphical and Mechanical Computation" by Joseph Lipka, published by John Wiley & Sons, Inc., N. Y., 1918, p. 29.

Certificate of Correction

June 20, 1950

Patent No. 2,512,387

JOHN WOODBURY SANDS

It is hereby certified that error appears in the above numbered patent requiring correction as follows:

In the grant, line 6, and in the heading to the printed specification, line 3, title of invention, for "TRANFORMATION" read *TRANSFORMATION*; column 3, line 48, for "autenite" read *austenite*; column 5, line 53, for "adjusment" read *adjustment*;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*